United States Patent [19]
Robertson

[11] Patent Number: 4,902,248

[45] Date of Patent: Feb. 20, 1990

[54] ADAPTORS

[75] Inventor: Michael W. Robertson, Truro, England

[73] Assignee: Staeng Ltd., Cornwall, United Kingdom

[21] Appl. No.: 285,731

[22] Filed: Dec. 16, 1988

[51] Int. Cl.[4] .............................................. H02G 15/02

[52] U.S. Cl. ...................................... 439/610; 439/840

[58] Field of Search ........ 439/445, 447, 448, 607-610, 439/578-585, 839, 840, 841, 464, 470; 174/73.1, 74 R, 75 R, 89, 75 F

[56] References Cited

U.S. PATENT DOCUMENTS

| | | | |
|---|---|---|---|
| 1,073,596 | 9/1913 | Egerton | 474/89 |
| 2,472,986 | 6/1949 | Reder, Jr. | 439/448 |
| 3,564,117 | 2/1971 | Scheffler | 174/89 |
| 4,053,200 | 10/1977 | Pugner | 439/578 |
| 4,629,275 | 12/1986 | Maul | 439/445 |
| 4,808,121 | 2/1989 | Smrekar | 439/578 |

FOREIGN PATENT DOCUMENTS

| | | | |
|---|---|---|---|
| 0409044 | 9/1966 | Switzerland | 439/841 |
| 0003794 | 4/1911 | United Kingdom | 439/841 |
| 1035830 | 7/1966 | United Kingdom . | |
| 2188796 | 10/1987 | United Kingdom . | |

*Primary Examiner*—David Pirlot
*Attorney, Agent, or Firm*—Stanger, Michaelson, Reynolds, Spivak & Tobia

[57] ABSTRACT

A connector backshell adaptor comprises a body portion (1) and a rotatable coupling nut (2) at one end. The body portion is provided with annular flanges (5,6), a sheathing (7) being clamped in the zone (4) between the flanges by means of at least one steel spring (8) which provides a constant pressure 360° around the body portion. Where two springs are provided these may be wound in either the same or opposite directions. In the constructions described the adaptor is re-usable, since the sheathing can be removed by releasing the constant pressure provided by the spring or springs.

19 Claims, 1 Drawing Sheet

ADAPTORS

FIELD OF THE INVENTION

The present invention relates to improvements in adaptors and in particular to connector backshell adaptors for use with heat shrinkable metallized parts.

DESCRIPTION OF THE PRIOR ART

A known construction of a connector backshell adaptor is disclosed in British Patent Specification No. 2,188,796. The adaptor disclosed in Specification No. 2,188,796 comprises a body portion, a rotatable coupling nut at one end, and a fixed part at the other end, separated by means of an annular groove. The fixed part comprises two sections separated by an annular groove. A cable screen is secured by means of two adhesives, the first of which is located in the annular groove whilst the second is located between the second section and the screen.

Another construction of a co-axial cable connector is disclosed in British Patent Specification No. 1,035,830. The connector comprises a metal body formed with external screw threads at one end and an annular shoulder on its inner surface. An insulating plug is arranged to seat on the shoulder of the body, and is provided with a cavity for receiving the end of a cable. An end cap has internal screw threads for engagements with the threads of the body. A contact member is formed of sheet metal bent or rolled in the form of a cylindrical sleeve having an axial slit.

One of the problems of the above described constructions is that they are not readily re-usable. In the case of the construction shown in British Patent Specification No. 2,188,796, once the cable screen has been secured by means of the two adhesives, it cannot readily be detached and re-sealed.

SUMMARY OF THE INVENTION

It is therefore an object of the present invention to overcome this problem.

According to the present invention there is provided a connector backshell adaptor which comprises a body portion, a rotatable coupling nut at one end, and spring means in the form of a spiral coil arranged to be wrapped around the body portion to rigidly secure a sheathing to the body portion of the adaptor.

Preferably said spring means provides a constant pressure 360° around the body portion and may be in the form of at least one open ended ribbon of spring steel.

The spring steel may encircle the body portion a plurality of times, preferably five or six.

Where two steel springs are used, they may either be wound in the same direction or opposite directions, each spring encircling body portion preferably between two and a half and three times.

BRIEF DESCRIPTION OF THE DRAWING

The present invention will now be described in greater detail by way of examples with reference to the accompanying drawings, wherein.

DESCRIPTION OF THE PREFERRED EMBODIMENT

Figure 1:
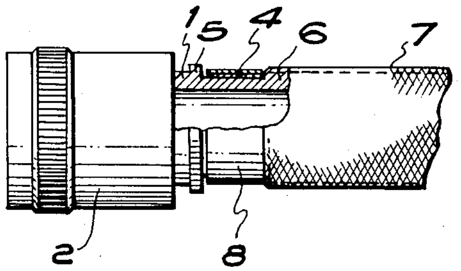
FIG. 1 is an elevation side view of a preferred form of connector backshell adaptor, the upper part being partly in section.
Figure 2:
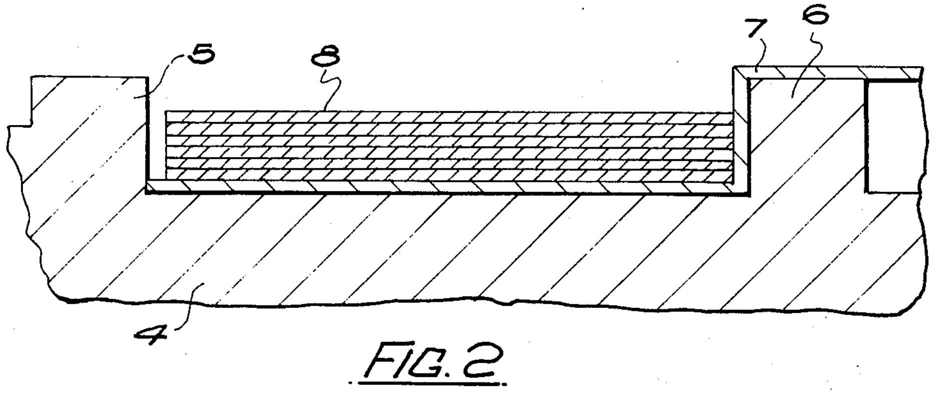
FIG. 2 is an enlarged part sectional view showing the coils of the spring.

Referring to FIGS. 1 and 2, the connector backshell adaptor comprises a body portion 1, and rotatable coupling nut 2 at one end. The body portion 1 is provided with an annular flange 5 in its central region and with a knurled annular flange 6 at its free end. A region 4 of the body portion 1 may be provided with a knurled zone (not shown). This zone may extend between the flanges 5 and 6. A sheathing 7 in the form of a tinned copper braid or a heat shrinkable or flexible plastic sleeving its fitted over the annular flange 6 and extends the length of the region 4 to abut against the annular flange 5.

In order to clamp the sheathing 7 to the body portion there is provided a constant pressure spring 8, whose width is slightly less than the distance between the flanges 5 and 6. The spring 8 is designed to abut against the shoulder of the annular flange 6, the sheathing 7 passing between the shoulder and the coil edges of the spring 8. The constant pressure spring 8 is in the form of a preformed spiral coil of spring steel which is open ended and which encircles the fixed part 4, a plurality of times, preferably at least five or six.

The constant pressure spring 8 acts in similar manner to a clock spring and has the effect of tightly gripping the sheathing 7 to prevent any rotational or longitudinal movement thereof in relation to the region 4. However, the spring 8 can be relatively easily unwound so that the sheathing 7 can be replaced should it become damaged.

In order to effect the attachment of the sheathing 7 to the adaptor, the end of the sheathing is placed over the region 4 and the spring is simply wound onto the end of the sheathing. Due to the knurled zone and the knurled annular flange 6, the pressure of the spring 8 ensures that the sheathing is tightly gripped.

Instead of providing a single spring 8 which encircles the fixed part 4 approximately six times as shown in FIG. 2, in a modified form two spiral springs are used, each encircling the fixed part 4 approximately three times each. These springs are wound in the same direction, the outer end of the inner spring substantially abutting against the inner end of the outer spring.

Figure 3:
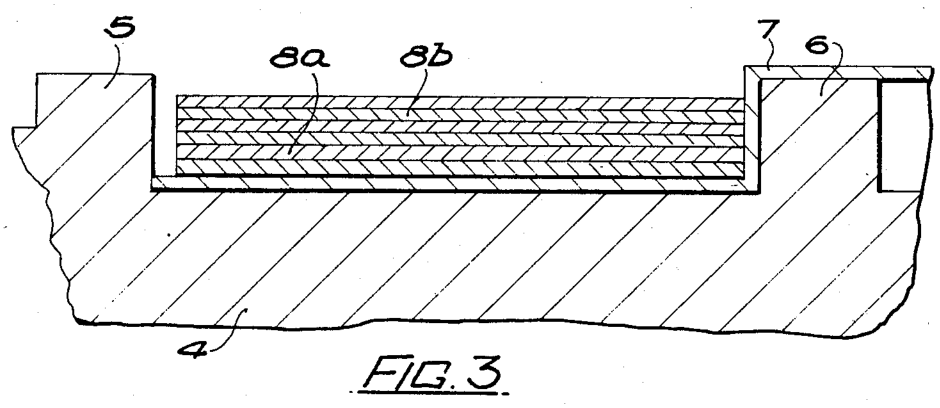
FIG. 3 is an enlarged part sectional view of a modified form where two springs are wound in the opposite direction.

In a further modified form shown in FIG. 3, the two spiral springs 8*a* and 8*b* are wound in the opposite directions. In this case it is preferable that the inner end of the outer spring 8*b* is substantially diametrically opposite the outer end of the inner spring 8*a*.

It has been found by experiment that two springs wound in opposite directions achieve substantially the same result as two springs wound in the same direction, and that the use of two springs as opposed to a single spring gives a better result.

The advantages of the above described construction are as follows:

(a) the adaptor is re-usable, since the sheathing can be removed by releasing the constant pressure provided by the spring or springs;

(b) the constant pressure spring or springs provides a 360° contact and thus prevents any slippage; and (c) the electrical impedance when measured from the body portion 1 to the sheathing 7 is between 1 and 1.2 milliohms.

What I claim is:

1. A connector backshell adaptor which comprises a body portion, a rotatable coupling nut at one end, and spring means in the form of a spiral coil arranged to wrapped around the body portion to rigidly secure a sheathing to the body portion of the adaptor, said spiral coil including a resilient ribbon arranged to be wrapped about the body in a plurality of overlapping turns.

2. A connector backshell adaptor according to claim 1, wherein said spring means provides a constant pressure 360° around the body portion.

3. A connector backshell adaptor according to claim 1, wherein said spring means is an open ended ribbon of spring steel.

4. A connector backshell adaptor according to claim 3, wherein said spring encircles the body portion at least five times.

5. A connector backshell adaptor according to claim 1, wherein said spring means includes a second open ended ribbon of steel spring each having overlapping turns.

6. A connector backshell adaptor according to claim 5, wherein one of said springs is an inner spring and the other of said springs is an outer spring, said outer spring overlapping said inner spring, each of said springs having an inner end and an outer end, and said springs are wound in the same direction, the inner end of the outer spring substantially abutting against the outer end of the inner spring.

7. A connector backshell adaptor according to claim 5, wherein said springs are wound in opposite directions, the inner end of the outer spring being substantially diametrically opposite to the outer end of the inner spring.

8. A connector backshell adaptor according to claim 5, wherein each spring encircles the body portion at least two and a half times.

9. A connector backshell adaptor which comprises a body portion, a rotatable coupling nut at one end of said portion, and spring means to rigidly secure a sheathing to the body portion of the adaptor and provide a constant pressure 360° around the body portion, said spring means being in the form of a spiral coil comprising an open ribbon of spring metal and arranged to be wrapped around the body portion in a plurality of concentric turns.

10. A connector backshell adaptor as in claim 9, wherein said ribbon is wrapped about said body in a plurality of overlapping turns.

11. A connector backshell adaptor according to claim 9, wherein said ribbon of spring metal encircles the body portion five or six times.

12. A connector backshell adaptor according to claim 9, wherein said spring means comprises a second open ended ribbon of spring metal wrapped around the first-mentioned ribbon.

13. A connector backshell adaptor according to claim 12, wherein said ribbons are wound in the same direction, the first mentioned ribbon having an outer end and the second ribbon having an inner end substantially abutting against the outer end of the first-mentioned ribbon.

14. A connector backshell adaptor according to claim 12, wherein said ribbons are wound in opposite directions, the first-mentioned ribbon having an outer end and the second ribbon having an inner end which is substantially diametrically opposite to the outer end of the first-mentioned ribbon.

15. A connector backshell adaptor according to claim 12, wherein each ribbon encircles the body portion between two and a half and three times.

16. A cable assembly, comprising:

a cable having a sheathing, a connector backshell adaptor connected to said cable, said connector having a body portion, said connector having a rotatable coupling nut at one end of said body portion, said connector having spring means for rigidly securing the sheathing to the body portion, said spring means being in the form of an open ribbon of spring metal arranged in a spiral coil of a plurality of overlapping turns.

17. An assembly as in claim 16, wherein said ribbon is overlapped to furnish a constant pressure 360° about said body portion.

18. An assembly as in claim 16, wherein said spring encircles the body portion five times.

19. An assembly as in claim 16, wherein said spring means includes a second open ended ribbon of spring steel.

* * * * *

UNITED STATES PATENT AND TRADEMARK OFFICE

Certificate

Patent No. 4,902,248 Patented: February 20, 1990

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Michael W. Robertson and Nicholas H. Neely.

Signed and Sealed this Twenty-Eighth Day of December, 1999.

P. AUSTIN BRADLEY
*Supervisory Patent Examiner*
Art Unit 2833

US004902248C1

(12) EX PARTE REEXAMINATION CERTIFICATE (4842nd)

United States Patent

Robertson et al.

(10) Number: US 4,902,248 C1

(45) Certificate Issued: Sep. 2, 2003

(54) ADAPTORS

(75) Inventors: Michael W. Robertson, Truro (GB); Nicholas H. Neely, Alphareta, GA (US)

(73) Assignee: Staeng Ltd., Truro (GB)

Reexamination Request:
No. 90/006,113, Sep. 20, 2001

Reexamination Certificate for:
Patent No.: 4,902,248
Issued: Feb. 20, 1990
Appl. No.: 07/285,731
Filed: Dec. 16, 1988

Certificate of Correction issued Dec. 28, 1999.

(51) Int. Cl.[7] .................................................. H01R 9/03
(52) U.S. Cl. ....................................... 439/610; 439/840
(58) Field of Search ................................ 439/610, 840, 439/578–585, 445, 447, 448, 607, 608, 609, 839, 841, 464, 470; 174/73.1, 74 R, 75 R, 75 F, 89

(56) References Cited

U.S. PATENT DOCUMENTS 4,808,128 A * 2/1989 Werth ......................... 439/610

OTHER PUBLICATIONS

Installation Instructions, Raychem Corp., published Nov. 1980, 1 pg.
HVS–1510–JCN Series, Raychem Corp., published Jul. 1984, 6 pgs.
HVS–1511–XLB, Raychem Corp., published Jul. 1984, 5 pgs.
Installation Instructions, Raychem Corp., published Feb. 1985, 4 pgs.
HVS–2510–JCN Series, Raychem Corp., published Mar. 1985, 6 pgs.
HVES–1520/90, Raychem Corp., published May 1985, 8 pgs.
Installation Instructions, Raychem Corp., published Dec. 1985, 1 pg.
HVS–2510E Series, Raychem Corp., published Mar. 1986, 6 pgs.
HVS–3510E Series, Raychem Corp., published Mar. 1986, 6 pgs.
HVS–2511E–4, Raychem Corp., published May 1986, 8 pgs.
HVS–1510E Series, Raychem Corp., published Jul. 1986, 6 pgs.
HVS–3510E, Raychem Corp., published Jan. 1987, 6 pgs.
Solderless Grounding Clamp Accessory Kit, Chemical Pub. Co., Inc., publishing date unknown, 1 pg.
Pictoral Handbook of Technical Devices, Chemical Pub. Co., Inc., published 1971, 4 pgs.

* cited by examiner

*Primary Examiner*—Tho D. Ta

(57) ABSTRACT

A connector backshell adaptor comprises a body portion (1) and a rotatable coupling nut (2) at one end. The body portion is provided with annular flanges (5,6), a sheathing (7) being clamped in the zone (4) between the flanges by means of at least one steel spring (8) which provides a constant pressure 360° around the body portion. Where two springs are provided these may be wound in either the same or opposite directions. In the constructions described the adaptor is re-usable, since the sheathing can be removed by releasing the constant pressure provided by the spring or springs.

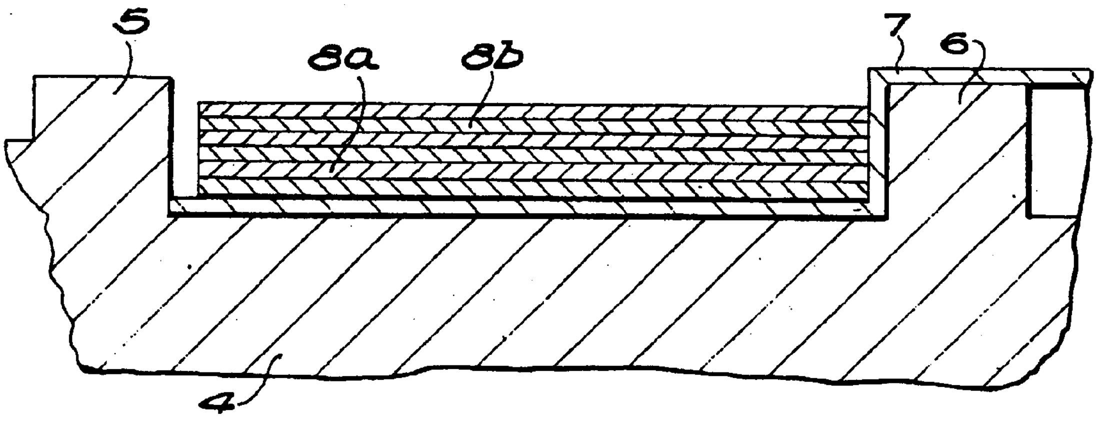

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9 and 16 are determined to be patenable as amended.

Claims 2–8, 10–15 and 17–19, dependent on an amended claim, are determined to be patenable.

1. A connector backshell adaptor which comprises a body portion, a rotatable coupling nut at one end, and spring means in the form of a spiral coil arranged to be wrapped *continuously* around the body portion to rigidly secure a sheathing to the body portion of the adaptor, said spiral coil including a resilient ribbon arranged to be wrapped about the body in [a plurality of] *more than two* overlapping turns*, the sheathing extending annularly about the body portion and underlying the spiral coil*.

9. A connector backshell adaptor which comprises a body portion, a rotatable coupling nut at one end of said portion, and spring means to rigidly secure a sheathing to the body portion of the adaptor and provide a constant pressure 360° around the body portion, said spring means being in the form of a spiral coil comprising an open ribbon of spring metal and arranged to be wrapped *continuously* around the body portion in [a plurality of] *more than two* concentric turns*, the sheathing extending annularly about the body portion and underlying the spiral coil*.

16. A cable assembly, comprising:

a cable having a sheathing, a connector backshell adaptor connected to said cable, said connector having a body portion, said connector having a rotatable coupling nut at one end of said body portion, said connector having spring means for rigidly securing the sheathing to the body portion, said spring means being in the form of an open ribbon of spring metal arranged*, to be wrapped continuously around the body portion* in a spiral coil of [a plurality of] *more than two* overlapping turns*, the sheathing extending annularly about the body portion and underlying the spiral coil*.

* * * * *